United States Patent Office 3,752,693
Patented Aug. 14, 1973

3,752,693
PROCESS FOR TREATING METALLIC BASE MATERIAL
Masao Suetsugi, Tokyo, Tadasu Kimura, Juichi Kobayashi, and Koji Matsushima, Hiroshima, and Hideo Nakamoto, Yamaguchi, Japan, assignors to Mitsubishi Rayon Company, Ltd., Tokyo, Japan
No Drawing. Filed May 12, 1971, Ser. No. 142,745
Claims priority, application Japan, May 15, 1970, 45/41,160
Int. Cl. B32b 15/08
U.S. Cl. 117—75                                  8 Claims

ABSTRACT OF THE DISCLOSURE

A metallic base material is treated to improve corrosion resistance, adhesion between the base material and film coated thereon, and post processability of said coating by applying a coating material contaning 1 to 85% of free isocyanate groups and then if desired further applying a resin-containing coating material.

BACKGROUND OF THE INVENTION

Field of the invention

This invention relates to a process for treating metallic base materials. More particularly this invention pertains to a method of treating metallic base materials to provide improved corrosion resistance, improved adhesion between the treated metallic base and other films to be coated thereon and improved processability.

Description of prior art

Heretofore, various processes have been preposed for improving the corrosion resistance, adhesion and post processability of metallic base materials by the use of various coating. Various coatings have been used in the prior art to improve the appearance and the chemical and physical characteristics, of metallic base materials. For instance, it is known to chemically treat metallic base materials with zinc phosphate, zinc chromate, etc. to improve corrosion resistance. The surface layers of the films formed thereby, however, have a tendency to change over a period of time when brought into contact with air and corrosion of the metallic base materials may actually be accelerated by absorption of moisture or oxygen from the air by the films. Moreover, although the metallic base materials chemically treated by such processes show improved adhesion to paints as compared with those which have not been treated chemically, the adhesion, processability, and corrosion resistivity of the resulting coated films has proved to be unsuitable for many purposes.

SUMMARY OF THE INVENTION

It has now been found that the surfaces of non-chemically treated or chemically treated metallic base materials may be treated with an organic compound containing functional isocyanate groups and when so treated will exhibit improved corrosion resistance, improved adhesiveness for further coating and improved processability.

According to the present invention a metallic base material is coated with an organic material (I) containing from 1 to 85% of free isocyanate groups. This coating may then be further coated with a thermoplastic or thermosetting coating material (II) thereon.

DETAILED DESCRIPTION OF THE PREFERRED EMBODIMENTS

The base material used herein may be pre-chemically treated or may be untreated. This base material is first coated with a coating material (I) containing 1% to 85% isocyanate groups to a thickness of $0.01\mu$ or more, and preferably 0.05 to $5\mu$. The resulting coated articles may be dried in air or subjected to heat treatment. The film thus formed on the surface of metallic base material will be found to be strongly adherent thereto. These films exhibit excellent bending properties and are less susceptible to attack by moisture from the air, or the like, which would corrode the metallic base material. The coated articles obtained in this manner may then be further coated with a thermoplastic or thermosetting coating material to impart good corrosion resistance, weathering resistance, resistance to chemicals and good appearance.

Suitable isocyanate compounds which may be used in the practice of the present invention include such monoisocyanates as butylisocyanate, laurylisocyanate, octadecylisocyanate and phenylisocyanate. It may further include such diisocyanates of the type OCN—R—NCO wherein R is an alkyl group containing 2–36 carbon atoms, or an arylcyclohexyl group, such as tetramethylenediisocyanate, hexamethylenediisocyanate, lysine diisocyanate, dimer acid diisocyanate and cyclohexane diisocyanate; tolyenediisocyanate, xylylenediisocyanate, diphenylmethanediisocyanate, methylphenylenediisocyanate, phenylenediisocyanate, etc.

Also compounds containing at least one free isocyanate group in the molecule may be used which have been obtained by reacting the aforesaid isocyanates with an aliphatic, aromatic or alicyclic compound containing an active hydrogen atom, e.g. containing a hydroxyl group, an amino group, a carboxyl group or the like. Representative of such compounds include the reaction products of a polyisocyanate, such as tolylenediisocyanate, xylylenediisocyanate, hexamethylenediisocyanate, etc. with at least one compound having a functional hydrogen atom, such as ethanol, butanol, lauryl alcohol, phenol, laurylamine, octylamine, acetic acid, propionic acid, stearic acid and benzoic acid.

Also mixtures or addition reaction products of the aforementioned isocyanates and compounds having two or more functional hydrogen atoms in the molecule, e.g. water, ethylene glycol, polyethyleneglycol, glycerine, trimethylolpropane, pentaerythritol, hexamethylenediamine, ethylenediamine, ethanolamine, phthalic acid, succinic acid, adipic acid, sebacic acid, trimellitic acid, polyesters obtained from polyhydric alcohol and polycarboxylic acid, vinyl polymers having hydroxyl groups or carboxyl groups on the side chain, and polyamides obtained from polyamines and polycarboxylic acids or amino acids, may be used. Exemplary of such coating materials include the polyisocyanate (trade name of Bayer, Desmodur N–75) obtained by reacting 3 moles of hexamethylenediisocyanate with 1 mole of water; the polyisocyanate (trade name, Desmodur L–75) obtained by reacting 3 moles of tolylenediisocyanate with 1 mole of trimethylolpropane; the polyisocyanate (trade name of Takeda Chemical Industry Ltd., Takenate D–110 N) obtained from xylylenediisocyanate and trimethylolpropane; and the partial addition product of hexamethylene diisocyanate and polyester.

If the coating material (I) contains less than 1% of free isocyanate groups, it will be difficult to sufficiently accomplish the objects of the present invention. The material (I), therefore, should contain greater than 1%, and preferably between 5% and 85% free isocyanate groups. The coating material (I) may be applied to the metallic base material surface in sufficient amounts such that the resulting film will have a thickness of $0.01\mu$ or more, and preferably between $0.05\mu$ and $5\mu$. If the thickness of film is less than $0.01\mu$, it will be difficult to sufficiently accomplish the objects of the present invention.

Thicknesses of greater than 5µ are undesirable from the point of view of appearance of the resulting coated article or may result in degradation of the chemical or physical properties of the surface. The reason why the aforementioned coating improves the corrosion resistance of the metallic base material is not entirely clear. It is presumed, however, that the water molecules adsorbed onto or retained as water of crystallization in the surface of the metallic base material reacts physically and/or chemically with the free isocyanate groups contained in the coating material (I) to form a strong film having a dense structure on the surface of the metallic base material. This seems to reduce the catalytic effect of the water or other compounds attached to the metal surface, which would cause corrosion of the metal surface, and hence corrosion is sharply reduced. Simultaneously the film formed may inhibit the approach of oxygen or the corroding substances to the metal surface.

If desired, the coating material (I) may be applied to the metallic base material in combination with additives, such as organic solvents, organic resins, pigments, fillers, etc., which are not excessively reactive with the isocyanate groups contained in the coating material (I). The coating material (I) thus prepared will exhibit improved coating processability and ease of handling.

Suitable organic solvents include the ketone type solvents, such as acetone, methyl ethyl ketone, methylisobutylketone or the like; the ester type solvents, such as ethylacetate, butylacetate; and the aromatic solvents, such as toluene, xylene, etc. Suitable organic resins usable include cellulose derivatives, such as nitrocellulose, cellulose acetate butyrate; epoxy resins; vinyl polymers; polyesters; polyamides; etc. An organic or inorganic pigment may be used in this invention. Suitable pigments include those commonly used for rust prevention, such as zinc chromate, strontium chromate, iron oxide, zinc oxide, zinc powder, aluminum powder, lead-iron alloy powder, barium metaborate, etc. These pigments may preferably be used in amounts of 5 to 200 parts based on 100 parts of the coating material (I). The coating processability of the coating material (I) may be improved by the use of these additives and the coating film will show favorable characteristics.

A second coating material (II) may be applied to the first coated (I) material. Any of the thermoplastic resins which are soluble in water, dispersible in water, soluble in solvent, of the sol type and hot-melt type, may be used, or any type of thermosetting resins. Exemplary of coating materials (II) include the alkyd resins, polyester resins, epoxy resins, the polyolefinic resins, such as polyethylene, polypropylene, etc., the polyamide resins, thermoplastic acrylic resins, thermosetting acrylic resins, etc. Particularly, the effect of the present invention is promoted when thermosetting resins are used.

The film formed according to the second step may improve further the properties of corrosion resistance and at the same time can sharply improve the appearance, weathering resistance, chemical resistance etc. of the metallic base material. These excellent effects are ascribable to the excellent adhesiveness between the isocyanate film formed in the first step and the metallic base material, and the excellent adhesiveness between the coating material formed on said isocyanate film, and by the synergistic characteristics of the combinations of the isocyanate film and the second coating material (II) applied therein. The coating film formed on the isocyanate film, have been found to be high in processability, as compared with the films formed, according to conventional processes, on non-treated metallic base materials or metallic base materials subjected to chemical treatment.

As stated above, the coating films obtained according to the present invention possess various excellent characteristics and are of inestimable practical value.

The present invention is illustrated below more fully with reference to examples. In the example part means weight part.

EXAMPLE 1

Rolled mild steel sheets each having a size of 70 mm. x 150 mm. x 0.8 mm. were immersed in toluene and then degreased by thoroughly wiping it with a cotton flannel cloth. Thereafter the sheets were subjected to sanding with #400 sandpaper to prepare panel (1). the panel (1) was coated on the surface respectively with the isocyanate compounds of the present invention mentioned below, to prepare panels (2) to (14) respectively. Each film formed thereon may have a thickness of 1–2µ. The panels (1)–(7) were forcibly dried at 80° C. for 30 minutes, while the coated panels (8)–(12) were forcibly dried at 130° C. for 30 minutes. All the panels thus treated were placed and allowed to stand in a thermostat kept at 20° C. and 75% RH. After 2 days, there was clearly observed the rust formed on the steel sheet surface of panel (1). In the cases of other panels treated with the present compounds, however, no changes were observed at all, even after lapse of one month.

Present isocyanate compounds coated:

(2) An addition product (trade name, Desmodur N–75; NCO content: 15%) of hexamethylenediisocyanate and water.
(3) An addition product (trade name, Takenate D–110 N; NCO content: 12%) of xylylenediisocyanate and trimethylolpropane.
(4) Tolylenediisocyanate (NCO content: 51%).
(5) Hexamethylenediisocyanate (NCO content: 50%).
(6) Laurylisocyanate (NCO content: 15%).
(7) An addition product (NCO content: 17%) of hexamethylenediisocyanate and butanol.
(8) A product (NCO content: 20%) obtained by adding hexamethylenediisocyanate to an alkyd resin consisting principally of soybean oil.
(9) A product (NCO content: 20%) obtained by adding tolylenediisocyanate to a copolymer of butylacrylate and methylmethacrylate.
(10) A product (NCO content: 10%) obtained by adding hexamethylenediisocyanate to a polyester obtained from adipic acid, neopentyl glycol, isophthalic acid and trimethylolpropane.
(11) A product (NCO content: 13%) obtained by adding tolylenediisocyanate to an epoxy resin (Epon 828, registered trade name of a resin produced by Shell Chemical Co.).
(12) A product (NCO content: 14%) obtained by adding hexamethylenediisocyanate to a copolymer of N-butoxymethylacrylamide, styrene, methylmethacrylate, butylacrylate and methacrylic acid.
(13) The mixture prepared from 95 parts of hexamethylenediisocyanate and 5 parts of ½" nitrocellulose having a 20% solid.
(14) The mixture prepared from 3 parts of zinc chromate and 97 parts of a product (NCO content: 20%) obtained by adding tolylenediisocyanate to a copolymer of butylacrylate and methylmethacrylate.

EXAMPLE 2

Heat cruable paint (a)

43 parts of ethyl acrylate, 43 parts of styrene, 10 parts of 2-hydroxyethylmethacrylate, 3 parts of methacrylic acid, 75 parts of xylol, 25 parts of n-butanol and 3.0 parts of azobisisobutyronitrile were polymerized to obtain a transparent copolymer solution. To 80 parts of the copolymer solution were added and kneaded therewith 20 parts of butyrated melamine resin (50% solution) and 50 parts of rutile type titanium oxide, whereby a white paint (a) was obtained.

The uncoated panel (1) and the coated panels (2), (3), (4), (6), (10), (11) and (12), which had been obtained in Example 1, and panel (15), which had been prepared by subjecting the surface of a rolled mild steel sheet to chemical treatment with zinc phosphate, were coated on the surface respectively with the above-mentioned paint. After setting for 30 minutes, the coated panels were baked at 150° C. for 20 minutes to form films thereon respectively. Properties of the formed films are shown in Table 1.

allowed to stand in a thermo-hygrostat kept at 20° C. and 75% RH for 15 days. Thereafter, these panesl were coated by means of barcoater with the above-mentioned enamel and baked, after a 20 minute setting, at 250° C. of 2–3μ thick. The panels (16)–(20) were forcibly dried at 250° C. for 60 seconds, which were then placed and for 60 seconds to form films thereon. Properties of the films thus obtained are shown in Table 2.

TABLE 1

| Panel | (1) | (15) | (2) | (3) | (4) | (6) | (10) | (11) | (12) |
|---|---|---|---|---|---|---|---|---|---|
| Thickness of film | 33 | 35 | 35 | 35 | 35 | 35 | 35 | 35 | 35 |
| Gloss (percent) | 92 | 93 | 88 | 90 | 90 | 91 | 87 | 90 | 93 |
| Hardness | 2 H | 2 H | 2 H | 2–3 H | 2 H | 2 H | 2 H | 3 H | 3 H |
| Ericksen (mm.) | 3.0 | 3.0 | 5.5 | 5.0 | 4.5 | 4.5 | 6.0 | 6.0 | 5.5 |
| Impact value (½ inch φ, 500 g., cm.) | 30 | 35 | 50 | 50 | 30 | 45 | 50 | 50 | 50 |
| Bending value (mm. φ) | 10 | 8 | 3 | 3 | 6 | 7 | 3 | 3 | 3 |
| Checker test | 98/100 | 98/100 | 100/100 | 100/100 | 100/100 | 100/100 | 100/100 | 100/100 | 100/100 |
| Salt spray test (50 hours) mm | 6 | 2 | 2 | 1–2 | 2 | 2 | 1–2 | 1 | 1, 2 |

In Table 1, hardness was represented by pencil hardness, and impact value was determined according to the Du Pont method. Bending value (mmφ) is determined by bending the panel at an angle of 180°. The smaller value of the bending value, the better of the flexibility. Checker test was conducted in such a manner that 100 squares each having a width of 1 mm. were prepared by cutting the film, and thereonto was applied "Scotch" tape (trade name) to peel off the same. The test result was represented by the number of squares which remained unstripped. The result of salt spray test was represented by a width of area left to rust on the cut portion sprayed aqueous 5% NaCl solution for 50 hours.

It is appreciated from the results shown in Table 1 that in the panels (1) and (15), which are comparative examples, the films formed on the metallic base materials were not so favorable in adhesion as well as in bendability in view of the results obtained in Ericksen, impact, bending and checker test, and also poor in rust preventing properties in view of the results obtained in salt spray test. In contrast thereto, it is understood that in the panels (2)–(12) prepared according to the present process, the obtained films are excellent in adhesion to the metallic base materials, and that said panels are excellent in post-processability in view of their excellent and also quite excellent in corrosion resistance.

EXAMPLE 3

A transparent copolymer solution was obtained from 30 parts of styrene, 27 parts of methylmethacrylate, 30 parts of butylacrylate, 10 parts of 2-hydroxyethylmethacrylate, 3 parts of methacrylic acid, 75 parts of solvesso #150, 25 parts of butanol, 3.0 parts of azobisisobutyronitrile and 0.5 part of t-dodecylmercaptan. 85 parts of the copolymer solution, 15 parts of a 50% solution of butoxymethylated melamine resin, 23 parts of rutile type titanium oxide, 7.4 parts of phthalocyanine blue, 4.3 parts of phthalocyanine green and 40 parts of dilute thinner were mixed together to prepare a blue enamel (b).

Galvanized steel sheets each having a size of 150 mm. x 300 mm. x 0.37 mm. were subjected to a chemical treatment with zinc phosphate to prepare panels (16). Panel (17) was prepared by coating the panel (16) with Desmodur N–75 (NCO content: 15%) so as to form thereon a film of 2–3μ thick. In similar manner, there were prepared panel (18) with Takenate D–110 N (NCO content: 12%), having a film of 1–2μ thick, panel (19) with Desmodur L–75 (NCO content: 13%), having a film of 0.5–1.5μ thick, and panel (20) with an addition product (NCO content: 3%) of 2 parts of hexamethylenediisocyanate and 4.6 parts of a 50% resin solution of polyester having a hydroxyl value of 50, having a film

TABLE 2

| Panel | (16) | (17) | (18) | (19) | (20) |
|---|---|---|---|---|---|
| Thickness of film (μ) | 15 | 16 | 18 | 17 | 17 |
| Gloss (percent) | 75 | 73 | 76 | 75 | 75 |
| Hardness | 2 H | 2 H | 2 H | 2 H | 2 H |
| Checker-Ericksen value (6 mm. extrusion) | ○ | ◎ | ◎ | ◎ | ◎ |
| Impact test (½ inch φ, 1 kg., 50 cm.): | | | | | |
| Front | △ | ◎ | ◎ | ○ | |
| Back | × | ◎ | ○ | ○ | ○ |
| Bending property | △ | ◎ | ○ | ○ | ○ |
| Salt spray test (120 hours), mm. | 3 | 1 | 1 | 2 | 2 |

In Table 2, Checker-Ericksen value was determined by a peeling test conducted in the following manner. 100 squares each having a width of 1 mm. were prepared by cutting the film, and then extruded 6 mm. using Ericksen apparatus and thereonto was applied a Scotch tape (trade name) to peel off the same. The values determined were represented by the following marks:

◎ ------------------- No square stripped.
○ ------------------- Less than 5 squares stripped.

Impact test on the film formed was conducted according to the Du Pont method, and the results obtained from the test using a dropping from a height of 50 cm. were represented by the following marks:

◎ ------------------- No damage caused.
○ ------------------- Slightly damaged.
△ ------------------- Damaged substantially.
× ------------------- Damaged completely.

Bending property was determined according to the following manner. Each panel was bent at an angle of 180° at a portion supported from the reverse side of panel with a piece of plate having a thickness of 1 mm., and the bent portion was subjected to peeling test with Scotch tape (trade name). The test results were represented by the following marks:

◎ ----------- No damage caused.
○ ----------- Slightly damaged but no peeling off of film caused.
△ ----------- Film caused to peel off substantially.

It is understood from the results shown in Table 2 that the films formed on the panels (17)–(20) according to the present invention are excellent in adhesion to the metallic base materials, quite excellent in processability, and also markedly superior in corrosion resistance to the films obtained by prior techniques.

EXAMPLE 4

59 parts of methylmethacrylate, 40 parts of butylacrylate, 1 part of methacrylic acid, 0.35 part of benzoylperoxide and 120 parts of toluene were polymerized to obtain a thermoplastic resin solution having 40% of a solid. 100 parts of the resin solution was thoroughly kneaded in a ball mill with 40 parts of rutile type titanium oxide to prepare a white paint (c).

A white paint (d) was prepared by adding a cobalt naphthenate dryer and rutile type titanium oxide to a phthalic acid type and spontaneously drying type alkyd resin having an oil length of 60%, in which linseed oil had been used as a drying oil.

A white paint (e) was prepared by adding 4.3 parts of a butoxymethylated melamine resin (50% solution) and 35.6 parts of titanium oxide to 45.8 parts of a polyester resin solution (60% solid) having 12 acid values, which had been obtained by a reaction of 20.9 parts of adipic acid, 36.5 parts of neopentyl glycol, 35.6 parts of isophthalic acid and 7.2 parts of trimethylolpropane, and The above-mentioned panels were allowed to stand for 1 day in a thermo-hydrostat kept at 30° C. and 75% RH. The panels were pretreated by coating the same with a 20% butyl acetate of Desmodur N–75 so as to form thereon films having a thickness of 1μ, and then forcibly dried at 150° C. for 10 minutes. The treated panels were left to stand in the aforesaid thermohygrostat for 24 hours to obtain panels (V), (VI), (VII) and (VIII). The panels (I)–(VIII) were coated with the white paint (b), which had been obtained in Example 2, so that the films formed thereon may have a dry thickness of 30μ, and the coated panels were baked at 150° C. for 20 minutes. Properties of the films thus formed are shown in Table 4.

TABLE 4

| | Metallic base material | | | | | | | |
|---|---|---|---|---|---|---|---|---|
| | Copper | | Brass | | Tin plated steel sheet | | Galvanized steel sheet | |
| Panel No. | (I) | (V) | (II) | (VI) | (III) | (VII) | (IV) | (VIII) |
| Pretreatment | (1) | (2) | (1) | (2) | (1) | (2) | (1) | (2) |
| Gloss (percent) | 89 | 88 | 90 | 90 | 93 | 91 | 93 | 90 |
| Pencil hardness | 2 H | 2 H | 2 H | 2 H | 2 H | 2 H | 2 H | H |
| Ericksen value | | | | | 4.0 | 6.0 | 3.5 | 6.5 |
| Checker test | 95/100 | 100/100 | 95/100 | 100/100 | 95/100 | 100/100 | 98/100 | 100/100 |
| Bending property (mm. φ) | | | | | 8 | 2 | 8 | 2 |
| Salt spray test (150 hours), mm | | | | | 6 | 1-2 | 6 | 1-2 |

1 Non-treated.; 2 Treated.

diluting the mixture with aromatic naphtha and butyl Cellosolve.

Rolled mild steel sheets each having a size of 70 mm. x 150 mm. x 0.8 mm. were degreased with toluene to prepare panel (21). Panel (22) was prepared by the coating panel (21) with, as a treatment agent, a 1:1 mixture of xylylenediisocyanate Desmodur N–75 so as to form thereon films each having a thickness of 2μ, and forcibly drying the coated panel at 150° C. for 10 minutes. The panels (21) and (22) were allowed to stand for 1 day in a thermo-hydrostat kept at 20° C. and 75% RH. Thereafter, the panels were coated respectively with the paints (c), (d) and (e) obtained above. The panels coated with the paints (c) and (d) were forcibly dried after a 20-minute setting and then cured at 130° C. for 29 minutes. The panel coated with the paint (e) was forcibly dried, after 20-minute setting and then cured at 130° C. for 20 minutes. Properties of the films formed are shown in Table 3.

It may be understood from the results shown in Table 4 that the films formed on the surfaces of metallic base irrespectively of the kind of metals used, which have been subjected to treatment in accordance with the present invention, are quite excellent in adhesion, and that the metallic base materials thus treated are very excellent in processability as well as in corrosion resistance.

EXAMPLE 6

7 parts of acrylamide, 25 parts of styrene, 25 parts of methylmethacrylate, 40 parts of butylacrylate, 3 parts of methacrylic acid, 25 parts of t-dodecylmercaptan, 4 parts of cumene hydroperoxide, 25 parts of butanol, and 25 parts of solvesso #150 were polymerized. To the polymerizate were added 0.2 part of maleic anhydride, 6 parts of formaldehyde and 9 parts of butanol to butoxymethylate the amide groups present in the polymer, and then diluted with solvesso #150.

Using 90 parts of the polymer solution obtained above,

TABLE 3

| | Paint (c) | | Paint (d) | | Paint (e) | |
|---|---|---|---|---|---|---|
| Panel | (21) | (22) | (21) | (22) | (21) | (22) |
| Treatment | (1) | (2) | (1) | (2) | (1) | (2) |
| Ericksen value (mm) | 7 | 8 | 7 | 7 | 8 | 8 |
| Impact strength (½ inch φ, 500 g., cm.) | 30 | 50 | 40 | 50 | 45 | 50 |
| Bending property (mm.φ) | 3 | 2 | 2 | 2 | 2 | 1 |
| Checker test | 100/100 | 100/100 | 95/100 | 100/100 | 98/100 | 100/100 |

1 Non-treated.
2 Treated.

It is understood from the results shown in Table 3 that the metallic base materials obtained by treatment in accordance with the present invention are apparently improvide in adhesion to the films formed on the surfaces thereof as evidenced by the results of Ericksen, impact, bending and checker tests, and that the films formed are, on the whole, excellent in formable property.

EXAMPLE 5

Panels prepared by degreasing copper sheets each having a size of 50 mm. x 50 mm. x 3 mm.—(I)
Panels prepared by degreasing brass sheets (Cu:Zn=7:3) each having a size of 50 mm. x 50 mm. x 3 mm.—(II)
Panels prepared by degreasing tin plated steel sheets each having a size of 50 mm. x 50 mm. x 0.4 mm.—(III)
Panels prepared by degreasing galvanized steel sheets each having a size of 50 mm. x 50 mm. x 0.4 mm.—(IV)

10 parts of an epoxy resin (Epon 1001, registered trade name of a resin produced by Shell Chemical Co.), 23 parts of rutile-type titanium oxide, 4.3 parts of phthalocyanine green and 40 parts of diluting thinner, there was obtained a blue enamel (f).

50 parts of ethylacrylate, 30 parts of styrene, 15 parts of N-butoxymethylmethacrylamide and 5 parts of itaconic acid were polymerized in isopropanol to obtain a solution. The solution was neutralized with ethanolamine to give a polymer solution having a solid content of 60%. 50 parts of the polymer solution was charged with 15 parts of rutile type titanium oxide to obtain a paste. The paste was diluted with water so that a solid content may become 40%, to obtain an aqueous white paint (g).

The panels (16) and (17) obtained in Example 3 were coated on the surface with the blue enamel (f) so as to give thereon films having a thickness of 15μ, and the coated panels were baked at 300° C. for 60 minutes. Properties of the films formed are shown in Table 5.

Separately, the panels (16) and (17) were coated on the surface with the white paint (g) so as to form thereon films having a thickness of 20μ, and the coated panels were baked at 180° C. for 20 minutes. Properties of the films formed are shown in Table 5.

TABLE 5

| Panel | Paint (f) | | Paint (g) | |
|---|---|---|---|---|
| | (16) | (17) | (16) | (17) |
| Gloss (percent) | 70 | 83 | 68 | 80 |
| Hardness | 2H | 3H | H | 3H |
| Checker-Ericksen (6 mm. extrusion) | ◉ | ◉ | ○ | ◉ |
| Impact test (½ inch φ, 1 kg., 50 cm.); | | | | |
| Front | △ | ◉ | × | ◉ |
| Back | × | ◉ | × | ◉ |
| Bending property | × | ◉ | × | ◉ |
| Salt spray test (120 hours), mm | 3 | 0.5 | 6 | 1 |

NOTE.—× in bending property; peeled off completely.

It may be said from the results shown in Table 5 that the coated films obtained according to the present invention are extremely excellent in corrosion resistance as well as in processability.

EXAMPLE 7

An aluminum sheet of 0.8 mm. thick and the aluminum sheet subjected to alumite treatment were treated respectively by coating the same with Desmodur N-75 so that the films formed thereon may have a thickness of 2-3μ.

Monomers consisting of 20 parts of 2-hydroxyethylmethacrylate, 50 parts of ethylmethacrylate, 27 parts of ethylacrylate and 3 parts of methacrylic acid were polymerized in toluene/butylacetate mixture to obtain a polymer solution having a solid content of 45%. 100 parts of the above polymer solution, 10 parts of Desmodur L-75 (trade name) and 100 parts of butylacetate were mixed. The obtained mixture was clear paint. The abovementioned aluminum sheet, Al₂O₃-treated aluminum sheet and those treated with the isocyanate were coated with the clear paint, so that the films formed thereon may have a thickness of 15μ, and the coated sheets were baked at 130° C. for 10 minutes. Properties of the films formed are shown in Table 6.

TABLE 6

| Base material | Aluminum sheet | | Aluminum sheet with Al₂O₃ layer | |
|---|---|---|---|---|
| Isocyanate treatment | (1) | (2) | (1) | (2) |
| Checker test | 98/100 | 100/100 | 95/100 | 100/100 |
| Ericksen (mm.) | 2.4 | 5 | 4 | 7 |
| Bending value (mm. φ) | 10 | 2 | 9 | 3 |
| Impact resistance (½ inch φ, 500 g., cm.) | 10 | 50 | 15 | 50 |

¹ Nontreated.
² Treated.

It may be understood from the results shown in Table 6 that the films obtained by treatment according to the present invention show excellent characteristics.

EXAMPLE 8

80 parts of 2-ethylhexylacrylate, 20 parts of 2-hydroxyethylacrylate, 3.0 parts of n-dodecylmercaptan, 25 parts of azobisisobutyronitrile, 50 parts of xylol, and 50 parts of butylacetate were copolymerized. The above obtained polymer solution (h) is clear solution. 17 parts of styrene, 17 parts of methylmethacrylate, 56 parts of n-butylacrylate, 10 parts of methacrylic acid, 4 parts of n-dodecylmercaptan, 4 parts of azobisisobutyronitrile and 100 parts of xylol were copolymerized. The obtained polymer solution (i) is clear. Galvanized steel sheets each having a size of 150 mm. x 300 mm. x 0.37 mm. were subjected to a chemical treatment with zinc phosphate to prepare panel (16). Panel (23) was prepared by coating the panel (16) with the mixture of 10 parts of copolymer (h) and 10 parts of Desmodur N-75 so as to form thereon a film of 2-3μ thick.

In similar manner, there was prepared panel (24) with the mixture of 10 parts of copolymer solution (h), 10 parts of Desmodur N-75 and 5 parts of ½" nitrocellulose (20% solution), having a film of 2-3μ thick, panel (25) with the mixture of 10 parts of copolymer (i) and 10 parts of Desmodur N-75, having a film of 2-3μ thick, panel (26) with the enamel prepared from 10 parts of copolymer (h), 10 parts of Desmodur N-75 and 2 parts of rutile type titanium oxide, having a film of 2-3μ thick, panel (27) with the enamel prepared from 10 parts of copolymer solution (h), 10 parts of Desmodur N-75 and 3 parts of zinc chromate, having a film of 2-3μ thick.

The panels (16), and (23)-(27) were forcibly dried at 250° C. for 60 seconds. Thereafter, these panels were coated by means of barcoater with the blue enamel (b), which had been obtained in Example 3, so that the films formed thereon may have a thickness of 15μ, and the coated panels were baked at 250° C. for 60 seconds. Properties of the films thus obtained are shown in Table 7.

TABLE 7

| Panel | (16) | (23) | (24) | (25) | (26) | (27) |
|---|---|---|---|---|---|---|
| Gloss | 75 | 80 | 82 | 80 | 76 | 75 |
| Hardness | 2H | 2H | 2H | 2H | 2H | 2H |
| Checker-Ericksen value (6 mm extrusion) | ○ | ◉ | ◉ | ◉ | ◉ | ◉ |
| Impact test (½ inch φ, 1 kg., 50 cm.): | | | | | | |
| Front | △ | ◉ | ◉ | ◉ | ◉ | ◉ |
| Back | × | ○ | ○ | ○ | △ | △ |
| Bending property | △ | ○ | ○ | ○ | △ | △ |
| Salt spray test (120 hours), mm | 3 | 1 | 1 | 1 | 0.6 | 0.1 |

It may be understood from the results shown in Table 7 that the films obtained by treatment according to the present invention show excellent characteristics.

We claim:
1. A process for coating metals which comprises applying a coating material (I) to the surface of the metal in a thickness of 0.01-5μ, said coating material (I) containing 1-85% by weight of free isocyanate group, and being selected from the group consisting of butylisocyanate, laurylisocyanate, octadecylisocyanate, phenylisocyanate, diisocyanates of the formula: OCN—R—NCO, wherein R is an alkyl group containing 2-36 carbon atoms or an arylcyclohexyl group, tetramethylenediisocyanate, hexamethylenediisocyanate, lysine diisocyanate, dimer acid diisocyanate, cyclohexane diisocyanate, tolylenediisocyanate, xylenediisocyanate, diphenylmethanediisocyanate, methaphenylenediisocyanate, phenylenediisocyanate, and reaction products thereof with an aliphatic, aromatic or alicyclic compound containing at least one active hydrogen atom selected from the group consisting of ethanol, butanol, lauryl alcohol, phenol, laurylamine, octylamine, acetic acid, propionic acid, stearic acid, benzoic acid, water, ethylene glycol, polyethylene glycol, glycerine, trimethylolpropane, pentaerythritol, hexamethylenediamine, ethylenediamine, ethanolamine, phthalic acid, succinic acid, adipic acid, sebacic acid, trimellitic acid, polyesters from polyhydric alcohols and polycarboxylic acid, hydroxyl containing vinyl polymers, carboxyl containing vinyl polymers, polyamides obtained from polyamines and polycarboxylic acid or amino acids; drying said coating material (I) and then applying to the surface of the material (I), a coating material (II) consisting essentially of a thermosetting polyester resin or a thermosetting acrylic resin and heating.

2. A process according to claim 1, wherein the material (I) is an addition product of a polyisocyanate of the formula OCN—R—NCO wherein R is an alkyl group containing 2-36 carbon atoms and a compound having at least one functional hydrogen atom in the molecule selected from the group consisting of carboxyl, amino and hydroxyl group.

3. A process according to claim 2, wherein the material (I) further contains a film forming material selected from the group consisting of cellulose acetate and nitrocellulose.

4. A process according to claim 2, wherein the material (I) contains 5 to 200 parts by weight of pigments selected from the group consisting of zinc chromate, strontium chromate, iron oxide, powdered zinc, powdered aluminum, powdered lead-iron alloy and barium metaborate, based on 100 parts of the material (I).

5. A process according to claim 1, wherein the material (II) is a thermosetting acrylic resin consisting principally of an acrylic polymer containing as a polar functional group, a hydroxyl, an N-alkoxyalkylamino group, or a mixture of such groups.

6. A process according to claim 5, wherein the material (II) is admixed with a butoxymethylated melamine resin.

7. A process according to claim 1, wherein the material (II) is thermosetting polyester resin consisting principally of a polyester containing, as a polar functional group, a carboxyl group.

8. A process according to claim 7, wherein the material (II) is admixed with a butoxymethylated melamine resin.

References Cited

UNITED STATES PATENTS

| | | | |
|---|---|---|---|
| 3,637,546 | 1/1972 | Parker | 117—74 |
| 3,454,533 | 7/1969 | Kerrigan et al. | 117—132 B X |
| 2,993,807 | 7/1961 | Abbott et al. | 117—75 X |
| 3,589,932 | 6/1971 | Wittcoff et al. | 117—132 B X |
| 2,850,424 | 9/1958 | Finelli et al. | 117—75 X |
| 3,035,939 | 5/1962 | Edwards | 117—75 |
| 2,356,005 | 8/1944 | Roquemore | 117—DIG. 7 |
| 3,425,886 | 2/1969 | Heins | 117—75 X |

FOREIGN PATENTS

| | | | |
|---|---|---|---|
| 834,917 | 5/1960 | Great Britain | 117—DIG. 7 |
| 758,433 | 10/1956 | Great Britain | 117—DIG. 7 |

RALPH HUSACK, Primary Examiner

U.S. Cl. X.R.

117—74, 132 B, 132 C, DIG. 7